Feb. 24, 1931.  S. N. BUCHANAN  1,793,455
PIPE COUPLER
Filed Feb. 20, 1928  2 Sheets-Sheet 1
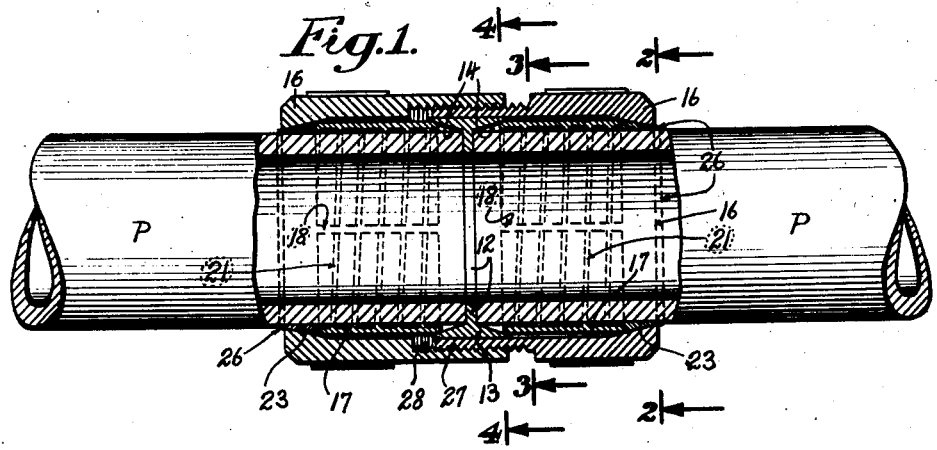
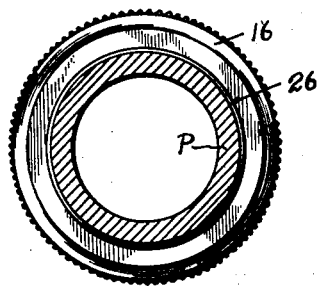
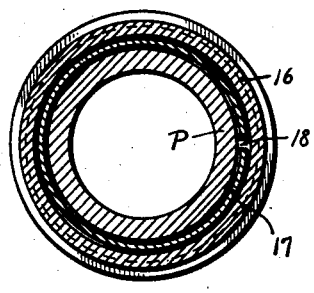
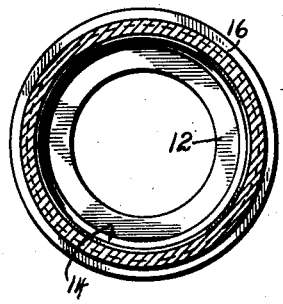
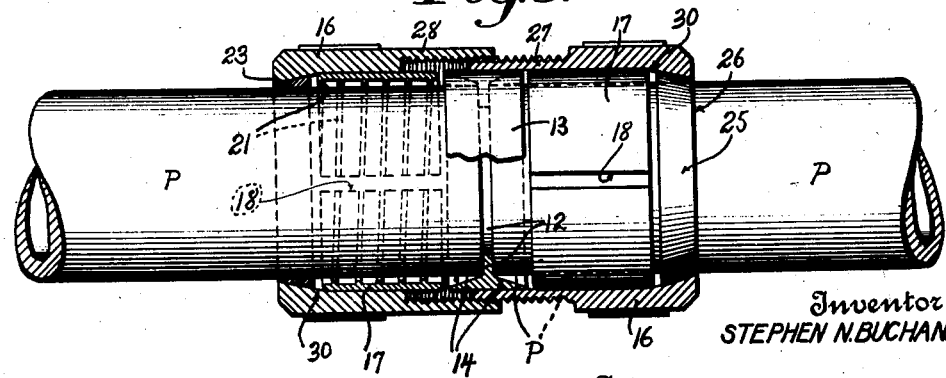
Inventor
STEPHEN N. BUCHANAN Feb. 24, 1931. S. N. BUCHANAN 1,793,455
PIPE COUPLER
Filed Feb. 20, 1928 2 Sheets-Sheet 2
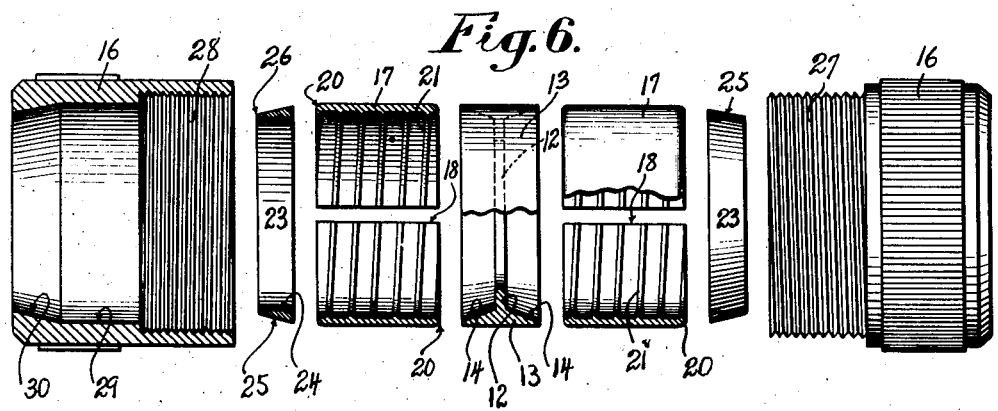
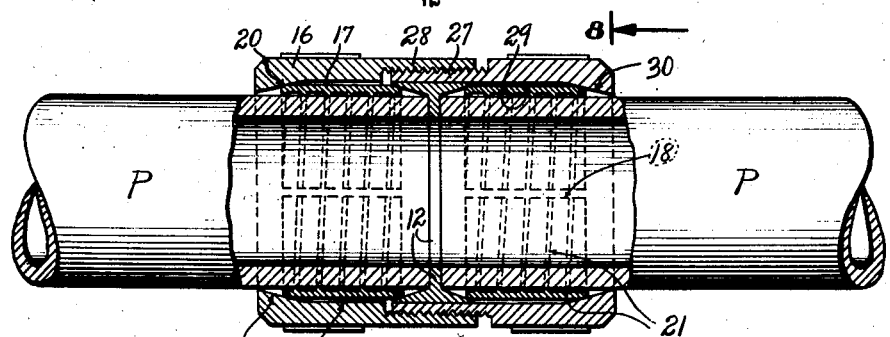
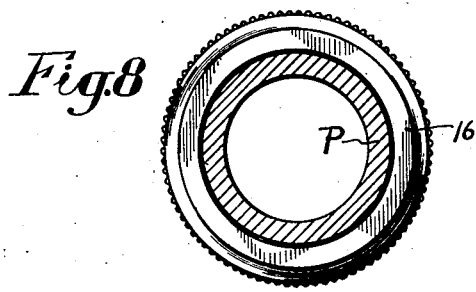
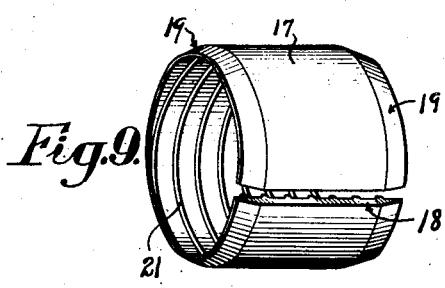
Inventor
STEPHEN N. BUCHANAN Patented Feb. 24, 1931

1,793,455

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

PIPE COUPLER

Application filed February 20, 1928. Serial No. 255,523.

This invention relates to pipe couples and more particularly to a threadless pipe coupler adapted to join together the smooth unthreaded adjacent ends of pipes, conduits, or the like.

An object of the invention is to produce a threadless pipe coupler so that conduits in electrical and other pipe installation work may be joined without threading the pipes, and to this end I provide a coupler device comprising operating means in the form of two cooperating coupler nuts which embrace the pipes to be coupled, together with one, two, or more anchorage members in the form of pipe anchorage sleeves which contract and grip with great force, by action of the operating means, around the unthreaded ends of pipes placed in the coupler device.

Another object of the invention is to produce a threadless pipe coupler provided with centering means by which the adjacent ends of pipes received thereinto are properly centered in the coupler device, and this centering means itself includes stationary operating means which cooperates with the rotatable nuts to impress a force longitudinally and circumferentially or radially on the anchorage sleeve or sleeves to seat and grip it or them on and about the part, such as a pipe, to be fixed to the coupler device.

It is also an object to produce a coupler which includes a distinct or individual pipe anchorage sleeve member for each unthreaded pipe to the end that each anchorage sleeve is caused to act independently of the other so that each sleeve grips around its respective pipe quite independently of the other sleeve in order that the coupler will positively join together two pipes of unequal size. In this way, the slight variation which sometimes occurs in pipes does not interfere with the position anchorage function of the coupler because it possesses a range of gripping action which adapts it to pipes which vary in size within a given limit.

A further object is to produce a threadless pipe coupler which forms a fluid pressure seal between two unthreaded pipe ends and which will hold against internal fluid pressure. The invention is therefore adapted for use in connection with both fluid pipes and electrical conduit work.

The accompanying drawings illustrate an example of the pipe coupler in accordance with the principles of this invention but it is to be understood that changes in form of the coupler or some of its parts and mode of operation may be resorted to without departing from the scope of the invention.

Figure 1 shows a coupler and pipe assembly in longitudinal section and tightened to final anchorage position. This view shows a packing gland placed in the coupler for use with pipe installations requiring fluid pressure joints.

Figure 2 shows a cross section on the line 2—2, Figure 3 on the line 3—3, and Figure 4 is a cross section on the line 4—4 of Figure 1.

Figure 5 shows a coupler and pipe assembly before the coupler is tightened to final position. The coupler operating means, shown as nuts, are in section as well as one of the pipe anchorage sleeves, while the other anchorage sleeve is in elevation. The center member, which includes a pipe stop to center the coupler on two pipe ends and which includes stationary operating tapers, is shown in fragmentary form with its upper portion in elevation and the lower portion in section.

Figure 6 shows a disassembled view of the coupler with its parts placed in spaced relation in their order of assembly.

Figure 7 shows a finally tightened coupler and pipe assembly similar to Figure 1, except that the packing gland is omitted, say in electrical conduit or other pipe work not requiring fluid pressure joints as are required and provided for in Figure 1.

Figure 8 shows a cross section on the line 8—8 of Figure 7.

Figure 9 shows a perspective view of a modified form of pipe anchorage sleeve wherein the sleeve ends are formed with a taper-wedging means which may be used in the coupler assembly instead of the rounded or oval blunt end coupler sleeve shown in the former views.

Figure 10 is a perspective view of the packing gland made of soft metal adapted to contract and flow into the fine openings or interstices of the pipe and coupler to seal the joint against inside fluid pressure.

Figure 11 shows a coupler and pipe assembly with two pipes of different size coupled together by this device. Since I employ an anchorage sleeve which independently grips around each pipe, it follows that a slight variation in the pipe sizes does not hinder the positive anchorage of the coupler.

According to the principles of this invention, I have produced a pipe coupler comprising operating means which includes coupler nuts adapted to be drawn toward each other as by screw thread means, together with pipe anchorage means in the form of sleeves, one on each pipe to be joined; and means are provided to centrally locate the pipe or pipes in the coupler, as well as means for applying a force to the one or more anchorage sleeves from both ends thereof and to apply a force radially thereto so as to cause a powerful longitudinal movement to seat and seal the packing gland and to cause contraction resulting in a pipe gripping action of great force.

Referring more particularly to the drawings for a description of an example of the invention, pipes P or the like may be secured together, without threading their ends, by this device which facilitates the installations in all manner of conduit work and fills a want long felt for a positive threadless coupler.

In Figure 6 the coupler parts are shown in spaced relation and it is observed that a pipe centering stop or flange 12 is integrally formed centrally of a beveled wedge-like internal tapered rim 13. The rim or ring 13 is made with oppositely extending internal bevels or tapering surfaces 14 formed to either side of the pipe centering or stop flange 12. The internal smooth tapers 14 extend in opposite directions and are thus defined by intersecting angles and are symmetrically disposed on each side of the stop 12.

The stop flange 12 is placed centrally within the coupler assembly and each inner end of the pipes P to be connected are thrust into the coupler until they abut against this stop. The height of the flange 12 above the taper 14 is preferably made about equal to the thickness of the wall of a pipe which affords a smooth continuous inside finish so as to cover any rough edges which may exist upon the pipe ends. The inside edge or rim of the stop 12 therefore forms a continuation of the inside diameter and surface of the pipe.

In connection with the centering device 12, it may be explained that its oppositely disposed smooth tapers 14 are employed as part of an operating means by which a longitudinal pressure is brought to bear against pipe anchorage members in the form of sleeves, later described. Another part of the operating means constitutes nuts 16 which approach each other by action of screw threads or other instrumentalities. Therefore, the nuts 16 and the rim 13 are together employed as operating means to act against the pipe anchorage members and collapse the latter around the pipe ends when a pipe joint is made with this coupler. One or more nuts 16 and the centering device 12—13 with its tapers 14 therefore provide suitable operating means for actuating the anchorage members or rendering the latter effective, as will be described.

One or more anchorage members in the form of sleeves 17 are provided, one being placed to either side of the centering member 13. Each anchorage sleeve 17 includes means rendering it elastic, yieldable or flexible so as to make it contractible and expansible. Each sleeve 17 expands to receive a pipe and is thereafter contracted by the combined movable and stationary operating means 16—14 to grip and anchor the pipe in the coupler. The form of anchorage member shown comprises a sleeve which is split longitudinally at 18. The ends of the sleeve 17 may be ovaled as at 20 or they may be tapered as shown at 19 in Figure 9 showing a modified form of the anchorage sleeve. The blunt ends 20 of the sleeve are ordinarily rolled or smoothed over to form the ovaled edge 20 which enables both ends of the anchorage sleeve to ride or move longitudinally against the wedge like tapers 30—14 of the combination operating means.

The internal pipe-gripping surfaces of the anchorage sleeve 17 are made in any suitable form but are ordinarily threaded, corrugated or ribbed with inside pipe biting convolutions as indicated at 21. This ribbed or threaded means 21 cuts through the pipe finish such as paint and cuts through scale on a conduit to establish positive mechanical and electrical connection. The coupler therefore effects a good electrical ground and mechanical connection with a pipe.

One or more packing glands or rings 23 are employed in the coupler assembly when it is used to make fluid pressure joints. The gland 23 is made of soft metal, say lead, copper or brass, or it may be made of fibrous material, the purpose being to provide a gland which withstands great internal fluid pressure, but which at the same time yields and flows, under the force of the operating means, into the pores or interstices prevalent at points of connection between the external surface of the pipe and internal surface of the coupler. This packing gland 23 is preferably a full circular ring and may be constructed with a straight internal cylindrical surface 23 and an external taper 25.

The taper 25 of the gland 23 may conform, i. e. be of the same angle as the taper 14 of the centering ring but the external taper 25 and internal taper 14 extend in opposite directions. The inside diameter 24 of the gland forms a snug fit with the pipe received into the coupler. However, upon tightening all parts together, the inside diameter 24 is reduced by contraction so as to squeeze against the pipe and form a fluid pressure joint therewith. The angle which the gland taper 25 makes with its cylinder 24 provides a substantially sharp edge 26 at one end of this gland ring 23. This sharp end edge 26 squeezes through the thin annular opening or clearance space between the pipe P and coupler nut 16 to make a fluid pressure joint.

The coupler device includes screw threads as a part of the operating means so as to draw the nuts toward each other. In the example shown, the threads are formed on the nuts. One nut is made with an external screw threaded sleeve 27 while the other nut is made with an internally threaded sleeve 28. This thread means 27—28, whether made on the nuts or some other part of the coupler, act to draw the nuts toward each other and finally anchor all parts together. The inside straight cylindrical bore 29 of each nut is sufficient in size to receive an anchorage sleeve 17 when the latter is free and expanded to normal size to receive a pipe end.

Each nut is made with a taper 30 which may be located at the outer end of the nut and the taper 30 decreases in diameter toward the outer end of the nut away from the threads thereof. The nut taper 30 and the gland taper 25 conform to each other in that they are made substantially on the same angle. Therefore a gland ring 23 is received into the nut and rests against the internal smooth taper 30 with the sharp end edge 26 in position ready to be compressed, squeezed and forced through the annular clearance space between the nut taper 30 and outside pipe surface when the operating nuts are tightened up. Both nuts 16 may be constructed substantially alike and a gland ring 23 and anchorage sleeve 17 is received into each nut in the order shown in Figure 6. Since the nut taper 30 and gland taper 25 conform to each other, a fluid pressure joint is made between these parts.

The use of the coupler with the packing gland 23 is shown in Figure 1 and when the two nuts are screwed together, the two glands 23 squeeze through the annular clearance spaces around the pipe within the taper 30 at each end of the coupler. The enforced longitudinal motion of the sleeve 17 within and relatively to the nut 16 forces the glands 23 into a contracted, compressed fluid tight seat and rams the gland home. The result is that the soft metal gland 23 is intimately squeezed into surface engagement with the pipe and nut and with the coupler joint at 26 and a fluid pressure joint is produced.

When the nuts are tightened up, the tapers 30 and 14 slide on and against the oval end 20 or 19 of each sleeve 17 to initiate contraction of the anchorage members 17 by imposition of a radial force which forces the sleeve split 18 together, and the inner sleeve surface, whether smooth or ribbed, contracts against a pipe. The engagement or coaction between the operating tapers 14—30 and sleeve ends 20 act to positively seat all parts in final position. Each sleeve 17 is independently acted on in two directions in that longitudinal pressure is exerted on the sleeve 17 by the approach of the tapers 30 and 14, and a resultant circumferential force is also applied to the sleeve by reason of the tapers 30 and 14 acting on the sleeve ends. The longitudinal force of the sleeve 17 forces the gland 23 into final position and the circumferential force also contracts the sleeves 17 with great force about each pipe. Each pipe is held in definitely centered position by the stop 12 so that the coupler device is itself centrally carried on the pipe joint, and each pipe anchorage sleeve 17 grips its pipe quite independently of the other sleeve.

I have therefore produced a pipe coupler which includes the movable rotatable nuts 16 carried at the outer ends of the coupler while the centrally disposed operating means 14 is stationary. Thus the center ring taper 14 slides with a straight longitudinal motion against the sleeve end while the nut taper 30 slides with a rotary motion onto the other end of the sleeve. The action of the rotatable operating means 16 and stationary operating means 14 is to impose lengthwise pressure through the sleeve and a contracting force to the sleeve which anchors all parts together because the sleeve is tightly gripped about the pipe.

Referring to Figure 11, it is noted that the pipes P and SP are of different sizes in that SP is the smaller pipe. The sleeve 170 embracing the smaller pipe SP has necessarily contracted more than the sleeve 17 so that the same powerful grip is secured on the smaller pipe as the larger. Variations which sometimes occur in the manufacture of the pipe therefore does not hinder or limit the use of this coupler. Also the packing gland 230 is pressed and squeezed through at 260 a greater distance than for the larger pipe P at the other end of the coupler and thus just as effectively seals the smaller pipe SP as occurs at the normal size pipe.

The coupler is now understood to include two cylindrically-shaped coupler nuts 16 which are provided with screw threads 27—28 on one end and an internal taper 30 at the other end. A straight cylindrical inside bore 29 receives a sleeve 17 into each nut. One end 20 or 19 of the sleeve bears against and forces a packing gland 23 to squeeze out through the taper 30 until a sufficient portion of this taper is engaged with the sleeve end 20 to coact against the sleeve end with consequent contraction and reduction in diameter to grip and anchor the pipe in the coupler. The two rings 23 and 13 are full-circular parts and hence no split or crevice or break is present to mar a continuous surface by which the gland 23 seals the pipe joint against leakage and by which the stop 12 forms a continuation of the inside pipe surfaces.

What is claimed is:

1. A coupler comprising, operating instrumentalities including two movable members adapted to embrace parts to be coupled together, means to draw the members together, a stationary member placed between the movable members to engage and contract a pair of anchorage members one being placed on each side of the stationary member and embracing the parts to be coupled, a wedge-like surface formed on the movable and on the stationary members and coacting against the anchorage members to grip the latter against the parts.

2. A coupler comprising, a pair of nuts adapted to embrace pipes and screw threads carried therewith to draw them together, each nut being provided with a bore which is tapered at one end and increases in diameter toward the screw threads, a center ring provided with taper means, and an elastic anchorage member disposed in the bore of each nut and acted on from each end thereof by the two tapers to grip the pipes.

3. A pipe coupler comprising, a centering flange against which two pipe ends abut, said flange carrying a tapered rim on each side thereof which increases in diameter away from the flange, a pair of split sleeves each of which has one end thereof engaged against one of the tapered rims, a pair of nuts each of which has a bore to receive a sleeve, and a taper formed in each nut and increasing in diameter toward each sleeve, whereby the two tapers in the pair of nuts and the two tapers on the rim all act simultaneously against each end of each sleeve to independently contract each sleeve about the pipes.

4. A pipe coupler comprising, two longitudinally split pipe anchorage sleeves, two coupler nuts having internal bores to receive the sleeves, each nut made with an internal taper at one end and increasing in diameter toward the bore, threads formed on the other ends of the nuts adapted to screw together and draw the nuts toward each other, a pipe stop disposed within the threaded portions of the nuts and including on each side thereof a taper which increases in diameter away from the stop, and the ends of the sleeves coacting against the tapers to independently contract each sleeve about a pipe as the nuts are screwed together.

5. A pipe coupler comprising, two cylindrically-shaped nuts having internal tapers at one end and screw threads at the other, end to connect the nuts and each nut is formed with a straight cylindrical surface between its taper and the threads, a full-circular packing gland mounted within the tapered end of the nut and including a sharp end formed by intersecting cylindrical and tapered gland surfaces which sharp end is adapted to squeeze through the annular space between the nuts and a pipe received therein, a full-circular stop flange placed centrally within the straight cylindrical surface of the connected nuts and adapted to remain stationary and against which pipe ends abut, said stop flange being provided with a taper on each side thereof and hence the tapers are disposed centrally within the connected nuts, all tapers named are increased in diameter toward the straight cylindrical surface of each nut and are formed on substantially the same angle, a split anchorage sleeve placed within each nut and one end of each sleeve bears against the gland and the inner ends of the sleeve bear on the tapers to each side of the stop flange; and the nuts are screwed together to push the glands forward in the tapers of the nuts to expose said tapers so the latter will coact with the sleeve ends and, together with the centrally disposed tapers, independently apply a combined longitudinal and radial force on both ends of each sleeve.

6. A coupler comprising a pair of contractile anchorage members, a stationary wedge for each anchorage member, a pair of movable wedges, each of said anchorage members being disposed between and engaged by a stationary and a movable wedge to radially contract the member, and means to force the movable wedges towards each other to engage the anchorage means.

In testimony whereof I affix my signature.

STEPHEN N. BUCHANAN.